(12) United States Patent
Heo et al.

(10) Patent No.: US 11,549,003 B2
(45) Date of Patent: Jan. 10, 2023

(54) COPOLYMER, RUBBER COMPOSITION, AND METHOD OF PREPARING THE SAME

(71) Applicant: Korea Kumho Petrochemical Co., Ltd., Seoul (KR)

(72) Inventors: Ji Hyun Heo, Seoul (KR); June Park, Seoul (KR); Cheolbeom Bae, Daejeon (KR); Sung Hoon Han, Sejong-si (KR); Se-Hee Jung, Sejong-si (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 396 days.

(21) Appl. No.: 16/664,146

(22) Filed: Oct. 25, 2019

(65) Prior Publication Data
US 2020/0255635 A1  Aug. 13, 2020

(30) Foreign Application Priority Data
Feb. 13, 2019  (KR) .................. 10-2019-0016506

(51) Int. Cl.
*C08L 9/06* (2006.01)
*C08F 297/04* (2006.01)

(52) U.S. Cl.
CPC ............ *C08L 9/06* (2013.01); *C08F 297/048* (2013.01); *C08L 2205/025* (2013.01)

(58) Field of Classification Search
CPC .............................. C08F 297/048; C08L 53/02
See application file for complete search history.

(56) References Cited

U.S. PATENT DOCUMENTS

| | | | | |
|---|---|---|---|---|
| 5,679,744 A | * | 10/1997 | Kawauzra | ................ C08L 7/00 525/314 |
| 6,355,728 B1 | * | 3/2002 | Kawazura | ................ B60C 1/00 152/905 |
| 2018/0251589 A1 | * | 9/2018 | Kusanose | ............... C08L 53/02 |

* cited by examiner

*Primary Examiner* — Jeffrey C Mullis (74) *Attorney, Agent, or Firm* — Novick, Kim & Lee PLLC; Jae Youn Kim

(57) ABSTRACT

Disclosed is a copolymer including a first part including an aromatic vinyl-based monomer and a conjugated diene-based monomer; and a second part including an aromatic vinyl-based monomer and a conjugated diene-based monomer, wherein the content of the aromatic vinyl-based monomer is 35 to 45% by weight based on a total weight of the copolymer, and the copolymer satisfies Equation 1 below:

$$V_1 > V_2 \qquad \text{<Equation 1>}$$

wherein $V_1$ is a vinyl content in the first part, and $V_2$ is a vinyl content in the second part.

9 Claims, 4 Drawing Sheets

RELATED TECHNOLOGY

PRESENT DISCLOSURE

High compatibility | High St SSBR
to BR & High randomness

COPOLYMER, RUBBER COMPOSITION, AND METHOD OF PREPARING THE SAME

CROSS-REFERENCE TO RELATED APPLICATION

This application claims the priority benefit of Korean Patent Application No. 10-2019-0016506, filed on Feb. 13, 2019 in the Korean Intellectual Property Office, the disclosure of which is incorporated herein by reference.

BACKGROUND OF THE DISCLOSURE

Field of the Disclosure

The present disclosure relates to a copolymer, a rubber composition, and a method of preparing the same.

Description of the Related Art

Ultra-high performance (UHP) tires mean tires that can be stopped quickly and accurately even on wet roads and have excellent handling properties allowing a driver to drive as intended, ensuring safe driving even at high speeds. Accordingly, a complex modulus meaning a handling property is one of the most important properties of UHP tires.

Existing UHP tires are manufactured using solution styrene-butadiene rubbers (SSBRs). Thereamong, products having a high Mooney viscosity due to a high vinyl content, and excellent wet grip are mainly used.

Recently, many tire manufacturers have developed new UHP tires suitable for luxury cars with a non-internal combustion engine, such as electric automobiles, or multipurpose vehicles. The purpose of such new UHP tire development is to reducing rolling resistance (RR) while maintaining stopping/handling properties of conventional UHP tires, thereby increasing fuel efficiency. Accordingly, there is a need for development of a novel SSBR material capable of meeting such a need.

The glass transition temperature ($T_g$) is determined according to the contents of styrene and vinyl forming a microstructure of a SSBR. When $T_g$ is the same, an SSBR having a high styrene content and a low vinyl content, compared to a conventional SSBR having a high vinyl content, is advantageous in harmoniously improving stopping resistance, handling, and rolling resistance characteristics.

In such a high-styrene SSBR, the content of styrene is about 40% by weight, and the content of vinyl is 25 to 35% by weight based on the amount of butadiene. However, when the high-styrene SSBR is polymerized, a styrene block may be generated due to a reactivity difference between styrene and 1,3-butadiene, and such a styrene block may act as a main cause of heat generation depending upon the position thereof in a polymer chain, thereby causing a fuel efficiency decrease due to rolling resistance.

To address such problems, a conventional preparation method uses a continuous or semi-batch polymerization method to constantly maintain reactivity between styrene and 1,3-butadiene and, thus, inhibit the generation of a styrene block. However, the molecular weight distribution of a copolymer prepared by continuously adding monomers according to such a method is 1.5 or higher, and such a high molecular weight distribution may cause an increase in rolling resistance so that fuel efficiency properties become poor.

In addition, a rubber composition prepared by mixing an SSBR with a butadiene rubber (BR) is generally mixed with a reinforcing agent to manufacture a tire tread. However, the high-styrene SSBR has poor compatibility with BR, which causes poor handling properties.

SUMMARY OF THE DISCLOSURE

Therefore, the present disclosure has been made in view of the above problems, and it is one object of the present disclosure to provide a rubber composition including an aromatic vinyl-conjugated diene-based copolymer having a high aromatic vinyl monomer content; and a conjugated diene-based polymer, wherein compatibility between the aromatic vinyl-conjugated diene-based copolymer and the conjugated diene-based polymer is excellent.

In accordance with an aspect of the present disclosure, the above and other objects can be accomplished by the provision of a copolymer, including a first part including an aromatic vinyl-based monomer and a conjugated diene-based monomer; and a second part including an aromatic vinyl-based monomer and a conjugated diene-based monomer, wherein the content of the aromatic vinyl-based monomer is 35 to 45% by weight based on a total weight of the copolymer, and the copolymer satisfies Equation 1 below:

$$V_1 > V_2 \qquad <\text{Equation 1}>$$

wherein $V_1$ is a vinyl content in the first part, and $V_2$ is a vinyl content in the second part.

In an embodiment, a total vinyl content in the copolymer may be 25 to 35% by weight.

In an embodiment, $V_1$ may be 25 to 50% by weight, and $V_2$ may be 10 to 35% by weight.

In an embodiment, a content of the aromatic vinyl-based monomer of the first part may be 15 to 45% by weight, and a content of the aromatic vinyl-based monomer of the second part may be 35 to 65% by weight.

In an embodiment, a weight ratio of the first part to the second part may be 1:0.5 to 1.5.

In an embodiment, the copolymer may have a weight average molecular weight of 100,000 to 250,000.

In an embodiment, the copolymer may have a molecular weight distribution of 1.0 to 1.2.

In an embodiment, a content of the aromatic vinyl-based block in the copolymer may be 1% by weight or less.

In an embodiment, at least a portion of the copolymer may be modified with one selected from the group consisting of piperidine, 1-[(4-ethylphenyl)methyl]-pyrrolidine, 1-(4-vinylbenzyl)pyrrolidine, N1-(3-(dimethylamino)propyl)-N3,N3-dimethyl-N1-(4-vinylbenzyl)propane-1,3-diamine, N1-(3-(dimethylamino)propyl)-N3,N3-dimethyl-N1-(4-vinylphenethyl)propane-1,3-diamine, N1-(2-(dimethylamino)ethyl)-N2,N2-dimethyl-N1-(4-vinylbenzyl)ethane-1,2-diamine; N1-(3-(diethylamino)propyl)-N3,N3-diethyl-N1-(4-vinylbenzyl)propane-1,3-diamine, triethoxysilylpropyldiethylamine, 3-glycidoxypropyldimethyldimethoxysilane, dimethyldichlorosilane, trimethylchlorosilane, methyldichlorosilane, methyltrichlorosilane, phenyltrichlorosilane, vinyltrichlorosilane, and a combination of two or more thereof.

In accordance with another aspect of the present disclosure, there is provided a rubber composition, including the copolymer; and a conjugated diene-based polymer.

In an embodiment, the polymer may be high-cis-1,4-polybutadiene or natural rubber.

In an embodiment, a weight ratio of the copolymer to the polymer may be 1 to 5:1.

In accordance with still another aspect of the present disclosure, there is provided a method of preparing a rubber composition, the method including adding an initiator to a mixture including a solvent, an aromatic vinyl-based monomer, a first conjugated diene-based monomer and a randomizing agent to initiate a reaction; adding a second conjugated diene-based monomer when a reaction temperature is elevated 25 to 35° C. from a temperature upon the adding of the initiator to prepare a copolymer; and mixing the copolymer with a conjugated diene-based polymer.

In an embodiment, a weight ratio of the aromatic vinyl-based monomer to the first conjugated diene-based monomer to the second conjugated diene-based monomer may be 37.5 to 42.5:45 to 50:10 to 15.

In an embodiment, the content of the solvent may be 4.5 to 6.5 times a total weight of the monomers in the method.

In an embodiment, the randomizing agent may be one selected from the group consisting of tetrahydrofuran, ditetrahydrofurylpropane, tetramethylethylenediamine, sodium-tertiary-amylate, and a combination thereof.

In an embodiment, the mixture in the adding of the initiator may further include a modifier. In an embodiment, the modifier may be one selected from the group consisting of piperidine, 1-[(4-ethylphenyl)methyl]-pyrrolidine, 1-(4-vinylbenzyl)pyrrolidine, N1-(3-(dimethylamino)propyl)-N3,N3-dimethyl-N1-(4-vinylbenzyl)propane-1,3-diamine, N1-(3-(dimethylamino)propyl)-N3,N3-dimethyl-N1-(4-vinylphenethyl)propane-1,3-diamine, N1-(2-(dimethylamino)ethyl)-N2,N2-dimethyl-N1-(4-vinylbenzyl)ethane-1,2-diamine; N1-(3-(diethylamino)propyl)-N3,N3-diethyl-N1-(4-vinylbenzyl)propane-1,3-diamine, and a combination of two or more thereof.

In an embodiment, reacting the copolymer with a silane-based coupling agent may be further included between the adding of the second conjugated diene-based monomer and the mixing of the copolymer.

In an embodiment, the silane-based coupling agent may be one selected from the group consisting of triethoxysilylpropyldiethylamine, 3-glycidoxypropyldimethyldimethoxysilane, dimethyldichlorosilane, trimethylchlorosilane, methyldichlorosilane, methyltrichlorosilane, phenyltrichlorosilane, vinyltrichlorosilane, and a mixture of two or more thereof.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Exemplary embodiments of the present disclosure are described in detail with reference to the accompanying drawings. However, the present disclosure may be implemented in various different forms and thus is not limited to these embodiments. In the drawings, to clearly describe the present disclosure, a part not relevant to the description is omitted, and like reference numerals in the specification denote like elements.

In the specification, when it is described that a certain part is "connected" to another part, it should be understood that the certain part may be directly connected to another part or indirectly connected to another part via another member in the middle. In addition, when a certain part "includes" a certain component, this indicates that the part may further include another component instead of excluding another component unless specifically stated otherwise.

A range of numerical values disclosed in the specification has the precision of the significant digits provided in accordance with standard rules in chemistry for significant digits, unless otherwise specified. For example, 10 includes a range of 5.0 to 14.9, and 10.0 includes a range of 9.50 to 10.49.

Hereinafter, embodiments of the present disclosure are described in detail with reference to the accompanying drawings.

In the specification, "vinyl content" means a weight ratio of a vinyl group in a conjugated diene in a polymer, i.e., 1,2-butadiene.

In the specification, "wet grip" is a property indicating a stopping resistance characteristic corresponding to braking force on a wet road. Braking force is superior as a tan δ value at 0° C., as one type of dynamic property data, is large.

In the specification, "rolling resistance" is a resistance occurring when a tire rolls on a horizontal road surface. Fuel efficiency characteristics are superior as a tan δ value at 60° C., as one type of dynamic property data, is small.

In the specification, "handling property" is a property related to a torsional torque generated upon occurrence of torsion caused by a slip angle imparted to a tire. The handling property is superior as a complex modulus (E*) at 60° C., as one type of dynamic property data, is large.

In the specification, "modification" means a technique of introducing, to a front end of a polymer chain where polymerization of the polymer is initiated, a middle part of the polymer chain, or a rear end of the polymer chain where the polymerization is stopped, a compound different from monomers of the polymer to increase specific properties.

Copolymer

A copolymer according to an aspect of the present disclosure may include a first part including an aromatic vinyl-based monomer and a conjugated diene-based monomer; and a second part including an aromatic vinyl-based monomer and a conjugated diene-based monomer, wherein the content of the aromatic vinyl-based monomer is 35 to 45% by weight based on a total weight of the copolymer, and Equation 1 below is satisfied:

$$V_1 > V_2 \qquad \text{<Equation 1>}$$

wherein $V_1$ is a vinyl content of the first part, and $V_2$ a vinyl content of the second part.

The copolymer may be, for example, a styrene-butadiene rubber (SBR) as a (random) copolymer, preferably, a solution styrene-butadiene rubber (SSBR). A conventional SSBR has a uniform aromatic vinyl-based monomer and a uniform vinyl content in any position of copolymer chain. (Single microstructure) The copolymer an embodiment of the present disclosure, however, may be a block copolymer composed of the first part and the second part. (Multiple microstructure) Each of the first part and the second part may have a uniform or non-uniform aromatic vinyl-based monomer content and a uniform or non-uniform vinyl content, even if the copolymer has the same composition as the conventional SSBR.

Figure 1:
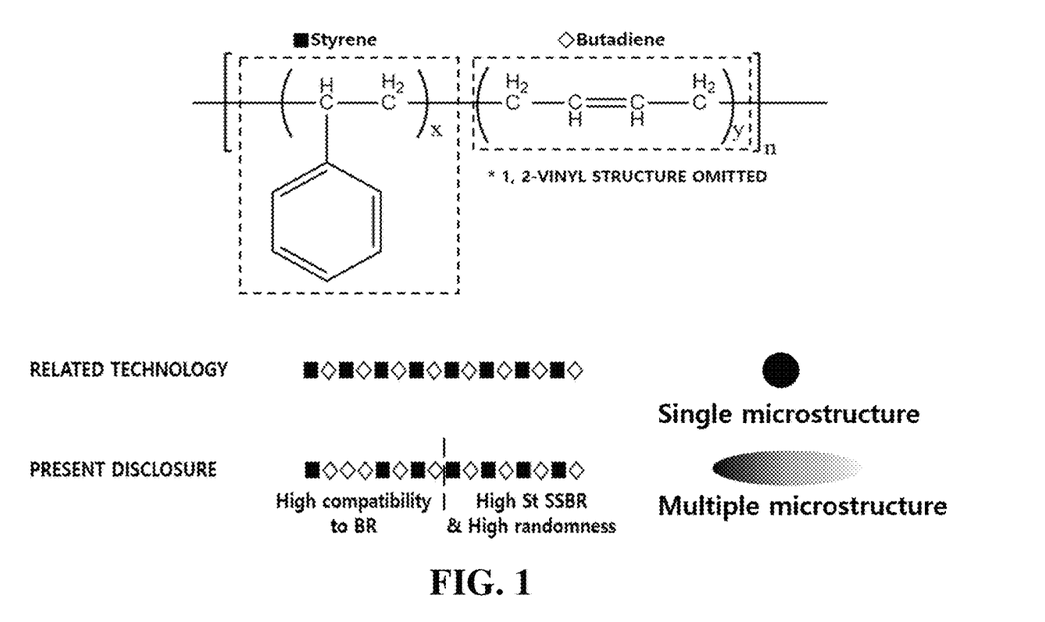
FIG. 1 schematically illustrates a microstructure of a copolymer according to an embodiment of the present disclosure compared to a conventional solution styrene-butadiene.

FIG. 1 schematically illustrates a microstructure of a styrene-butadiene rubber according to a single microstructure of conventional technology and a multiple microstructure of a copolymer according to an embodiment of the present disclosure. Referring to FIG. 1, a microstructure having excellent compatibility with a conjugated diene-based polymer may be formed because a ratio of a conjugated diene-based monomer is high and thus a vinyl content is also high in the first part, and a microstructure having a high aromatic vinyl-based monomer content and high randomness may be formed in the second part.

A total vinyl content in the copolymer may be 25 to 35% by weight based on the diene-based monomer.

$V_1$ denoting a vinyl content in the first part may be 25 to 50% by weight, preferably 30 to 45% by weight, more preferably 35 to 40% by weight, and $V_2$ denoting a vinyl content in the second part may be 10 to 35% by weight, preferably 20 to 30% by weight. When $V_1$ is less than 25% by weight, compatibility with the conjugated diene-based polymer may be decreased. When $V_1$ is greater than 50% by weight, $T_g$ of the copolymer may excessively rise, whereby processability may be deteriorated. When $V_2$ is less than 10% by weight, rolling resistance may increase. When $V_2$ is greater than 35% by weight, $T_g$ of the copolymer may excessively rise, whereby abrasion resistance may be decreased.

Based on a total weight of the copolymer, the content of the aromatic vinyl-based monomer may be 35 to 45% by weight, preferably 38 to 42% by weight, the content of the aromatic vinyl-based monomer of the first part may be 15 to 45% by weight, preferably 25 to 35% by weight, and the content of the aromatic vinyl-based monomer of the second part may be 35 to 65% by weight, preferably 45 to 55% by weight.

A weight ratio of the first part to the second part may be 1:0.5 to 1.5, preferably 0.75 to 1.25. The weight ratio may be adjusted according to the aromatic vinyl-based monomer content and vinyl content of each of the first and second parts. By changing the weight ratio, an aromatic vinyl-based monomer content and vinyl content in the whole copolymer may be adjusted, thereby realizing desired properties.

The copolymer includes the first part having a relatively high vinyl content and a relatively low aromatic vinyl-based monomer content; and the second part having a relatively low vinyl content and a relatively high aromatic vinyl-based monomer content, thereby exhibiting excellent compatibility with the conjugated diene-based polymer while having a high aromatic vinyl-based monomer content based on the whole copolymer.

When a vinyl content and aromatic vinyl-based monomer content in the copolymer are respectively less than the ranges, $T_g$ may be lowered, so that wet grip or tensile strength may be decreased. When a vinyl content and aromatic vinyl-based monomer content in the copolymer respectively exceed the ranges, $T_g$ may rise, so that abrasion resistance may be decreased.

Figure 2:
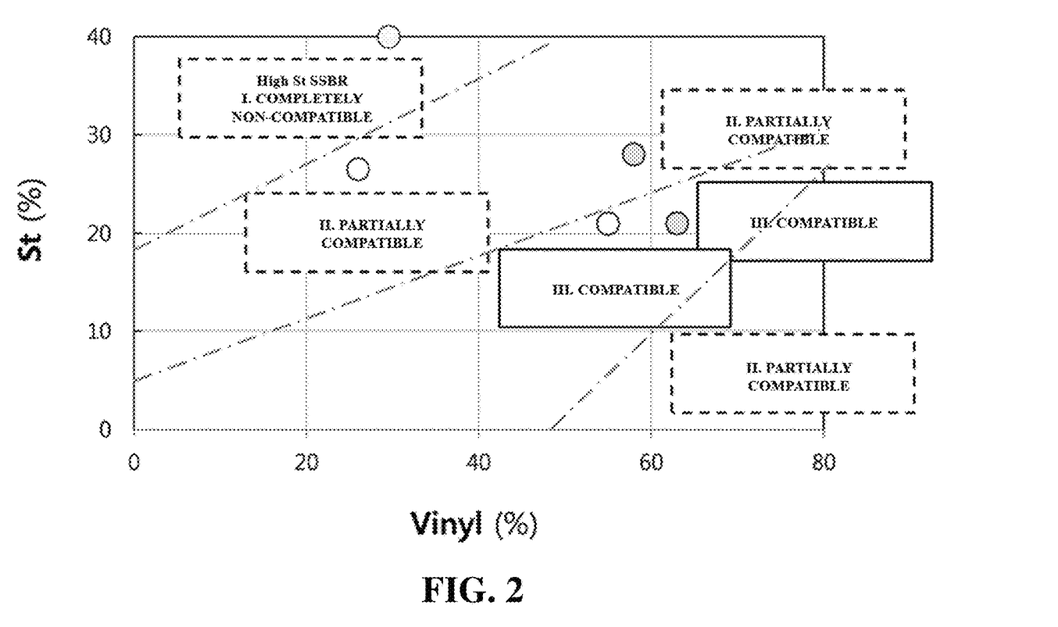
FIG. 2 schematically illustrates compatibility with a butadiene rubber dependent upon the contents of styrene and vinyl in a styrene-butadiene copolymer.

FIG. 2 schematically illustrates compatibility between a styrene-butadiene rubber and a butadiene rubber. Referring to FIG. 2, it can be confirmed that compatibility with the butadiene rubber is decreased with increasing styrene content. The copolymer of the present disclosure forms a microstructure, i.e., the first part, having high compatibility with the conjugated diene-based polymer, thereby addressing the problem.

The copolymer may have a weight average molecular weight ($M_w$) of 100,000 to 250,000, preferably 150,000 to 200,000, more preferably 170,000 to 185,000.

The copolymer may have a molecular weight distribution ($M_w/M_n$) of 1.0 to 1.2, preferably 1.10 to 1.15. When the molecular weight distribution of the copolymer is greater than 1.2, rolling resistance increases, whereby fuel efficiency characteristics may not reach a desired level. Such a weight average molecular weight or molecular weight distribution may be measured according to a method, e.g., gel chromatography, known in the art.

In the case of a low-molecular weight copolymer, it is easier to realize a low molecular weight distribution. Meanwhile, there may be a problem that a molecular weight distribution or the content of an aromatic vinyl-based block increases with increasing copolymer molecular weight. However, since the copolymer of the present disclosure has a low molecular weight distribution while having a high molecular weight and excludes an aromatic vinyl-based block, excellent fuel efficiency characteristics may be realized compared to conventional copolymers.

The content of an aromatic vinyl-based block in the copolymer may be 1% by weight or less. Preferably, the copolymer may not include an aromatic vinyl-based block. For example, the aromatic vinyl-based block may be a styrene block when styrene is used as an aromatic vinyl-based monomer.

The aromatic vinyl-based block may be identified according to various conventional methods such as Fourier transform infrared spectroscopy (FT-IR), nuclear magnetic resonance spectroscopy (NMR), differential scanning calorimetry (DSC), and the Koldhof method. For example, the presence of an aromatic vinyl-based block may be investigated by the Koldhof method of staining an aromatic vinyl-based domain in a copolymer with osmium acid, and then observing the same with a transmission electron microscope. The aromatic vinyl-based block may cause heat generation, thereby increasing rolling resistance. As a result, fuel efficiency characteristics may be decreased.

The aromatic vinyl-based monomer may be one selected from the group consisting of styrene, α-methyl styrene, α-ethyl styrene, p-methyl styrene, vinyl toluene and a mixture of two or more thereof, preferably styrene, but the present disclosure is not limited thereto.

The conjugated diene-based monomer may be one selected from the group consisting of 1,3-butadiene, 2,3-dimethyl-1,3-butadiene, piperylene, 3-butyl-1,3-octadiene, isoprene, 2-phenyl-1,3-butadiene, and a mixture of two or more thereof, preferably 1,3-butadiene, but the present disclosure is not limited thereto.

The copolymer may include a third monomer, a coupling agent, or a terminal modifier, whereby compatibility with a reinforcing agent, e.g., silica, may be significantly improved.

For example, at least a portion of the copolymer may be modified with one selected from the group consisting of piperidine, 1-[(4-ethylphenyl)methyl]-pyrrolidine, 1-(4-vinylbenzyl)pyrrolidine, N1-(3-(dimethylamino)propyl)-N3,N3-dimethyl-N1-(4-vinylbenzyl)propane-1,3-diamine, N1-(3-(dimethylamino)propyl)-N3,N3-dimethyl-N1-(4-vinylphenethyl)propane-1,3-diamine, N1-(2-(dimethylamino)ethyl)-N2,N2-dimethyl-N1-(4-vinylbenzyl)ethane-1,2-diamine; N1-(3-(diethylamino)propyl)-N3,N3-diethyl-N1-(4-vinylbenzyl)propane-1,3-diamine, triethoxysilylpropyldiethylamine, 3-glycidoxypropyldimethyldimethoxysilane (GPDMS), dimethyldichlorosilane, trimethylchlorosilane, methyldichlorosilane, methyltrichlorosilane, phenyltrichlorosilane, vinyltrichlorosilane and a combination of two or more thereof, but the present disclosure is not limited thereto.

Rubber Composition

A rubber composition according to another embodiment of the present disclosure may include the copolymer; and a conjugated diene-based polymer.

The polymer may be high-cis-1,4-polybutadiene or natural rubber. The high-cis-1,4-polybutadiene may include cis-1,4-polybutadiene in an amount of 90% by weight or more, preferably 95% by weight or more, more preferably 97% by weight or more. Heat generation resistance and elasticity of the rubber composition may increase with increasing cis content. Such high-cis-1,4-polybutadiene may be prepared using, for example, a neodymium (Nd)-based catalyst, but the present disclosure is not limited thereto.

A weight ratio of the copolymer to the polymer may be 1 to 5:1, preferably, 2.5 to 3.5:1.

The rubber composition may further include a reinforcing agent, preferably silica. A weight ratio of the copolymer to the polymer to silica may be 1 to 5:1:1 to 5, preferably 2.5 to 3.5:1:2.5 to 3.5.

In the case of a rubber composition prepared by mixing a conventional high-styrene SSBR having a styrene content of 35% by weight or more with a butadiene rubber, compatibility between the high-styrene SSBR and the butadiene rubber is poor, whereby handling properties are poor. On the other hand, in the case of the rubber composition according to an embodiment of the present disclosure, the second part included therein improves compatibility with the polymer, whereby excellent handling properties may be realized.

The rubber composition may be used to manufacture a tire, etc. By using the rubber composition, a tire having stopping resistance and fuel efficiency characteristics similar or superior to conventional tires, but improved handling properties may be manufactured. Accordingly, the rubber composition may be suitably used for, particularly, production of a high-performance tire.

Rubber Composition Preparation Method

A method of preparing a rubber composition according to an aspect of the present disclosure may include (a) a step of adding an initiator to a mixture including a solvent, an aromatic vinyl-based monomer, a first conjugated diene-based monomer and a randomizing agent to initiate reaction; (b) a step of adding a second conjugated diene-based monomer when a reaction temperature in step (a) is elevated 25 to 35° C. to prepare a copolymer; and (c) a step of mixing the copolymer with a conjugated diene-based polymer.

In the case of a conventional method of preparing a copolymer having a high aromatic vinyl-based monomer content, monomers are added two or more times or continuously to constantly maintain the reactivity of an aromatic vinyl-based monomer and a conjugated diene-based monomer. Such a conventional method allows production of a copolymer having a high an aromatic vinyl content and high randomness, but may cause an increase in an molecular weight distribution of the copolymer.

However, steps (a) and (b) according to the aspect of the present disclosure may be performed using a batch-type polymerization method. In step (a), a reaction may be initiated using a batch-type polymerization method, and then additionally adding a conjugated diene-based monomer once to suppress an increase in a molecular weight distribution.

In addition, when a copolymer is prepared according to a conventional method, a tapered microstructure, instead of a block microstructure, is formed, whereby compatibility with a conjugated diene-based copolymer may be insufficient.

The "reaction temperature" means a temperature elevated by the reaction of step (a), not by means of a heat stirrer. When the addition of step (b) is performed when an increase in the reaction temperature is less than 25° C., a molecular weight distribution of a produced copolymer may increase. When the addition of step (b) is performed when an increase in the reaction temperature exceeds 35° C., an aromatic vinyl-based block may be formed.

The types and effects of the aromatic vinyl-based monomer and the conjugated diene-based monomer are the same as those described above. By using the method, a rubber composition satisfying the aforementioned characteristics may be prepared, and the first conjugated diene-based monomer and the second conjugated diene-based monomer may be the same as or different from each other.

A weight ratio of the aromatic vinyl-based monomer to the first conjugated diene-based monomer to the second conjugated diene-based monomer may be 37.5 to 42.5:45 to 50:10 to 15. The sum of the weight ratios of the monomers may be 100, but the present disclosure is not limited thereto.

When a weight ratio of the aromatic vinyl-based monomer is less than 37.5, an aromatic vinyl-based monomer content in the copolymer may be decreased. When a weight ratio of the aromatic vinyl-based monomer exceeds 42.5, an aromatic vinyl-based block may be formed in the copolymer. When a weight ratio of the first conjugated diene-based monomer to the second conjugated diene-based monomer is outside the range, an aromatic vinyl-based block may be formed in the copolymer or a vinyl content in the copolymer may excessively increase, so that it may be difficult to prepare a rubber composition satisfying desired properties.

The solvent may be one selected from the group consisting of benzene, methylbenzene, heptane, n-hexane, cyclohexane and a mixture of two or more thereof, preferably cyclohexane, but the present disclosure is not limited thereto. The content of the solvent may be 4.5 to 6.5 times, preferably 5 to 6 times, more preferably 5.5 times, a total weight of the monomers used in the method. When the content of the solvent is less than 4.5 times a total weight of the monomers, a molecular weight distribution may increase. When the content of the solvent exceeds 6.5 times a total weight of the monomers, a reaction time may excessively increase. "A total weight of the monomers used in the method" may mean the sum of the weights of the aromatic vinyl-based monomer, the first conjugated diene-based monomer, and the second conjugated diene-based monomer.

The randomizing agent may be one selected from the group consisting of tetrahydrofuran (THF), ditetrahydrofurylpropane (DTHFP), tetramethylethylenediamine (TEMDA), sodium-tertiary-amylate (STA) and a combination thereof, preferably ditetrahydrofurylpropane, but the present disclosure is not limited thereto.

The mixture of step (a) may further include a modifier.

The mixture of step (a) may further include a modifier. The modifier may be one selected from the group consisting of piperidine, 1-[(4-ethylphenyl)methyl]-pyrrolidine, 1-(4-vinylbenzyl)pyrrolidine, N1-(3-(dimethylamino)propyl)-N3,N3-dimethyl-N1-(4-vinylbenzyl)propane-1,3-diamine, N1-(3-(dimethylamino)propyl)-N3,N3-dimethyl-N1-(4-vinylphenethyl)propane1,3-diamine, N1-(2-(dimethylamino)ethyl)-N2,N2-dimethyl-N1-(4-vinylbenzyl)ethane-1,2-diamine; N1-(3-(diethylamino)propyl)-N3,N3-diethyl-N1-(4-vinylbenzyl)propane-1,3-diamine, and a combination of two or more thereof, but the present disclosure is not limited thereto. The modifier may modify a front end or middle part of the copolymer.

Between step (b) and step (c), a step of reacting the copolymer with a silane-based coupling agent may be further included. The silane-based coupling agent may be one selected from the group consisting of triethoxysilylpropyldiethylamine, 3-glycidoxypropyldimethyldimethoxysilane, dimethyldichlorosilane, trimethylchlorosilane, methyldichlorosilane, methyltrichlorosilane, phenyltrichlorosilane, vinyltrichlorosilane, and a mixture of two or more thereof, preferably triethoxysilylpropyldiethylamine, but the present disclosure is not limited thereto. The coupling agent may modify a middle part or rear end of the copolymer.

The mixing of step (c) may be freely performed to achieve a desired purpose according to a method known in the art. The microstructure, i.e., the second part, of the copolymer may serve as a link for reducing interfacial resistance of each of the copolymer and the polymer in step (c), thus improving compatibility. Accordingly, the bonding force among the copolymer, the polymer, and the reinforcing agent increases, so that mechanical properties, wear properties, and dynamic properties of the rubber composition may be improved and, particularly, handling properties may be significantly improved.

Hereinafter, examples of the present disclosure are described in more detail. However, the following experimental results show only representative experimental results of the examples, and the scope and contents of the present disclosure cannot be construed to be reduced or limited by the examples and the like. Each effect of the various embodiments of the present disclosure not expressly set forth below will be specifically described in a relevant section.

Preparation Example 1

A mixture of 1,680 g of cyclohexane as a solvent, 122.3 g of styrene as an aromatic vinyl-based monomer, 143 g of 1,3-butadiene as a conjugated diene-based monomer, 6.2 g of 1-(4-vinylbenzyl)pyrrolidine as the third monomer, 6.3 g of ditetrahydrofurylpropane (DTHFP) as a randomizing agent, and 3.2 g of piperidine was charged into a 10 L reactor under a nitrogen atmosphere and mixed therein, and 6.3 g of n-butyllithium was fed into the reactor dropwise to react with impurities until the color of the mixture turned yellow. Next, 9.1 g of n-butyllithium was immediately added to the reactor via a pump to initiate adiabatic temperature-rise polymerization.

When a reaction temperature rose 30° C. from an initiation temperature, 38.1 g of 1,3-butadiene was added for 5 minutes in an in-situ manner. After 2 minutes, 1.1 molar equivalents of triethoxysilylpropyldiethylamine, based on a total weight of the monomers, was added for 5 minutes, followed by terminating the polymerization. As a result, a copolymer was obtained.

Preparation Example 2

1,680 g of cyclohexane as a solvent, 123.1 g of styrene as an aromatic vinyl-based monomer, 144.3 g of 1,3-butadiene as a conjugated diene-based monomer, 6.3 g of 1-(4-vinylbenzyl)pyrrolidine as the third monomer, 7.2 g of ditetrahydrofurylpropane as a randomizing agent, and 3.2 g of piperidine were charged into a 10 L reactor under a nitrogen atmosphere and mixed therein, and 6.4 g of n-butyllithium was fed into the reactor dropwise to react with impurities until the color of the mixture turned yellow. Next, 9.2 g of n-butyllithium was immediately added to the reactor via a pump to initiate adiabatic temperature-rise polymerization.

When a reaction temperature rose 30° C. from an initiation temperature, 38.0 g of 1,3-butadiene was added for 5 minutes in an in-situ manner. After 2 minutes, 1.1 molar equivalents of triethoxysilylpropyldiethylamine, based on a total weight of the monomers, was added for 5 minutes, followed by terminating the polymerization. As a result, a copolymer was obtained.

Examples 1 to 4

The copolymer (solution styrene-butadiene rubber, SSBR) of Preparation Example 1 or 2, silica, and other components were mixed in a 500 cc lab mixer according to compositions summarized in Table 1 below, thereby preparing a rubber composition. A mixed rubber was prepared from the rubber composition using an open twin-screw roll mill, and then vulcanized at 165° C. for 20 minutes, thereby producing a rubber specimen.

TABLE 1

| Composition | Example 1 | Example 2 | Example 3 | Example 4 |
|---|---|---|---|---|
| Preparation Example 1 | 100 | 75 | — | — |
| Preparation Example 2 | — | — | 100 | 75 |
| High-cis BR | — | 25 | — | 25 |
| Stearic acid | 2 | 2 | 2 | 2 |
| Zinc oxide | 3 | 3 | 3 | 3 |
| Silica | 80 | 80 | 80 | 80 |
| Oil | 10 | 10 | 10 | 10 |
| Si-69 | 6.4 | 6.4 | 6.4 | 6.4 |
| CZ | 1 | 1 | 1 | 1 |
| DPG | 1.5 | 1.5 | 1.5 | 1.5 |
| Sulfur | 1.5 | 1.5 | 1.5 | 1.5 |

(units: parts by weight)
High-cis BR: KBR01, manufactured by KUMHO PETROCHEMICAL
Silica: Degussa 7000GR
Si-69: Bis-(triethoxysilylpropyl)tetrasulfide
Oil: TDEA Oil
CZ: N-cyclohexyl benzothiazolyl sulfenamide
DPG: 1,3-diphenylguanidine Comparative Examples 1 to 4

Rubber specimens were manufactured under conditions summarized in Table 2 below in the same manner as in the examples. SLR6430 manufactured by Trinseo was used as SSBR 1, and SE-7274 manufactured by Sumitomo was used as SSBR 2.

TABLE 2

| Composition | Comparative Example 1 | Comparative Example 2 | Comparative Example 3 | Comparative Example 4 |
|---|---|---|---|---|
| SSBR 1 | 100 | 75 | — | — |
| SSBR 2 | — | — | 100 | 75 |
| High-cis BR | — | 25 | — | 25 |
| Stearic acid | 2 | 2 | 2 | 2 |
| Zinc oxide | 3 | 3 | 3 | 3 |
| Silica | 80 | 80 | 80 | 80 |
| Oil | 10 | 10 | 10 | 10 |
| Si-69 | 6.4 | 6.4 | 6.4 | 6.4 |
| CZ | 1 | 1 | 1 | 1 |
| DPG | 1.5 | 1.5 | 1.5 | 1.5 |
| Sulfur | 1.5 | 1.5 | 1.5 | 1.5 |

(units: parts by weight)

Experimental Example 1

The properties of the SSBRs used in Examples 1 to 4 and Comparative Examples 1 to 4 were measured and summarized in Table 3 below.

The copolymers prepared in Preparation Examples 1 and 2 were diblock copolymers having two different microstructures (blocks). The characteristics of each of the blocks were measured and summarized in Table 4 below.

TABLE 3

| Classification | Preparation Example 1 | Preparation Example 2 | SSBR 1 | SSBR 2 |
|---|---|---|---|---|
| Styrene content (%) | 40 | 40 | 40 | 38 |
| Block styrene content (%) | 0 | 0 | 0 | 0 |
| Vinyl content (%) | 26 | 33 | 25 | 33 |
| Molecular weight distribution ($M_w/M_n$, MWD) | 1.10 | 1.14 | 1.78 | 1.57 |
| Weight average molecular weight (g/mol) | 180,000 | 181,000 | 360,000 | 157,000 |
| Modification | Modified | Modified | Non-modified | Modified |

TABLE 4

| Classification | Preparation Example 1 | Preparation Example 2 |
|---|---|---|
| Total styrene content in copolymer (%) | 40 | 40 |
| Total vinyl content in copolymer (%) | 26 | 33 |
| Total weight average molecular weight of copolymer (g/mol) | 180,000 | 181,000 |
| First block styrene content (%) | 30 | 30 |
| First block vinyl content (%) | 35 | 38 |
| First block weight average molecular weight (g/mol) | 80,000 | 90,000 |
| Second block styrene content (%) | 50 | 50 |
| Second block vinyl content (%) | 19 | 28 |
| Second block weight average molecular weight (g/mol) | 100,000 | 90,000 |

Copolymer microstructure and content analysis: Analyzed using a nuclear magnetic resonance (NMR) spectrometer manufactured by Bruker. As a sample, chloroform-d was used.
Weight average molecular weight and molecular weight distribution: Measured by gel permeation chromatography (GPC) according to a polystyrene standard measurement method.

Experimental Example 2

The properties of the rubber specimens of Examples 1 to 4 and Comparative Examples 1 to 4 were analyzed and summarized in Tables 5 to 8 below. The properties of the rubber specimens of the examples were converted to have higher values as properties are superior, based on the properties of the rubber specimens of the comparative examples, and summarized in Tables 5 to 8 below.

TABLE 5

| Classification | Comparative Example 1 | Example 1 |
|---|---|---|
| Mooney viscosity of compound (@100° C.) | 100 | 115 |
| Payne (ΔG') | 100 | 166 |
| Hardness | 100 | 97 |
| Modulus upon 300% elongation | 100 | 121 |
| Tensile strength | 100 | 103 |
| Elongation percentage | 100 | 99 |
| Lambourn abrasion characteristic | 100 | 98 |
| Rebound resilience | 100 | 98 |
| Wet grip (tanδ@0° C.) | 100 | 117 |
| Rolling resistance (tanδ@60° C.) | 100 | 106 |
| E"@0° C. | 100 | 125 |
| E'@60° C. | 100 | 84 |
| Handling property (E*)@60° C. | 100 | 84 |

TABLE 6

| Classification | Comparative Example 2 | Example 2 |
|---|---|---|
| Compound Mooney viscosity (@100° C.) | 100 | 110 |
| Payne (ΔG') | 100 | 114 |
| Hardness | 100 | 98 |
| Modulus upon 300% elongation | 100 | 108 |
| Tensile strength | 100 | 105 |
| Elongation percentage | 100 | 108 |
| Lambourn abrasion characteristic | 100 | 99 |
| Rebound resilience | 100 | 92 |
| Wet grip (tanδ@0° C.) | 100 | 106 |
| Rolling resistance (tanδ@60° C.) | 100 | 105 |
| E"@0° C. | 100 | 122 |
| E'@60° C. | 100 | 103 |
| Handling property (E*)@60° C. | 100 | 102 |

TABLE 7

| Classification | Comparative Example 3 | Example 3 |
|---|---|---|
| (@100° C.) | 100 | 107 |
| Payne (ΔG') | 100 | 145 |
| Hardness | 100 | 100 |
| Modulus upon 300% elongation | 100 | 101 |
| Tensile strength | 100 | 105 |
| Elongation percentage | 100 | 108 |
| Lambourn abrasion characteristic | 100 | 99 |
| Rebound resilience | 100 | 102 |
| Wet grip (tanδ@0° C.) | 100 | 106 |
| Rolling resistance (tanδ@60° C.) | 100 | 112 |
| E"@0° C. | 100 | 80 |
| E'@60° C. | 100 | 94 |
| Handling property (E*)@60° C. | 100 | 94 |

TABLE 8

| Classification | Comparative Example 4 | Example 4 |
|---|---|---|
| Compound Mooney viscosity (@100° C.) | 100 | 105 |
| Payne (ΔG') | 100 | 122 |
| Hardness | 100 | 100 |

TABLE 8-continued

| Classification | Comparative Example 4 | Example 4 |
|---|---|---|
| Modulus upon 300% elongation | 100 | 101 |
| Tensile strength | 100 | 104 |
| elongation percentage | 100 | 100 |
| Lambourn abrasion characteristic | 100 | 100 |
| Rebound resilience | 100 | 98 |
| Wet grip (tanδ@0° C.) | 100 | 105 |
| Rolling resistance (tanδ@60° C.) | 100 | 109 |
| E"@0° C. | 100 | 109 |
| E'@60° C. | 100 | 106 |
| Handling property (E*@60° C.) | 100 | 106 |

The properties of Table 5 to 8 were measured as follows:

Compound Mooney viscosity (@ 100° C.): A unvulcanized blend was attached to the front and back of a rotor, and the rotor was mounted on a rotary viscometer (MOONEY MV2000, manufactured by ALPHA Technologies). The rotor was started after preheating up to 100° C. for the first 1 minute, and a viscosity change in the blend was measured for 4 minutes to measure a compound Mooney viscosity expressed as $ML_{1+4}$@ 100° C.

Payne (ΔG'): A difference in G' values was measured in a strain rate range of 0.28 to 40% at 60° C. using a measuring device (RPA2000, manufactured by ALPHA Technologies) to confirm a silica dispersion degree.

Hardness: Measured using a SHORE-A hardness tester.

Tensile strength, elongation percentage, and modulus upon 300% elongation: Measured using a universal test machine (UTM) according to ASTM 3189 Method B.

Lambourn abrasion characteristic: A specimen was brought into direct contact with a grinding stone using a Lambourn abrasion tester to measure an abrasion degree.

Rebound resilience: Measured according to ISO 4662-86.

Dynamic property values (tan δ, E", E', E*) of vulcanized rubber: Analyzed at a frequency of 10 Hz under a strain condition of 0.2 using a DTMA 5 instrument manufactured by Rheometic.

Comparing Examples 1 to 4 to Comparative Examples 1 to 4, it can be confirmed that the copolymer prepared according to an embodiment of the present disclosure has significantly high compatibility with the high-cis butadiene rubber (high-cis BR), thus exhibiting excellent properties when mixed with the high-cis BR. This is considered to occur because the copolymers prepared in the Preparation Examples 1 and 2 include the first block having high compatibility with the butadiene rubber. When an appropriate amount of 1,3-butadiene is additionally added in an in-situ manner after preparing the first block having a high vinyl content upon preparation of the copolymer, a styrene content in the whole copolymer may be increased while inhibiting formation of block styrene. In addition, a diblock copolymer including the first block, which has satisfactory compatibility with a butadiene rubber due to a relatively high vinyl content, and the second block, which has excellent properties due to a relatively low vinyl content and high styrene content, may be prepared.

Experimental Example 3

Preparation Example 3 satisfying the characteristics shown in Table 9 were prepared in the same manner as in Preparation Examples 1 and 2. The styrene content of each block was controlled by varying the ratio of initially added aromatic vinyl monomers to conjugated diene monomers and the timing of addition of the conjugated diene monomers Rubber specimen (A) was manufactured in the same manner as in Example 4, except that Preparation Example 3 was used instead of Preparation Example 2.

Rubber specimen (B) was manufactured in the same manner as in Comparative Example 4 using SSBR 2.

Figure 3:
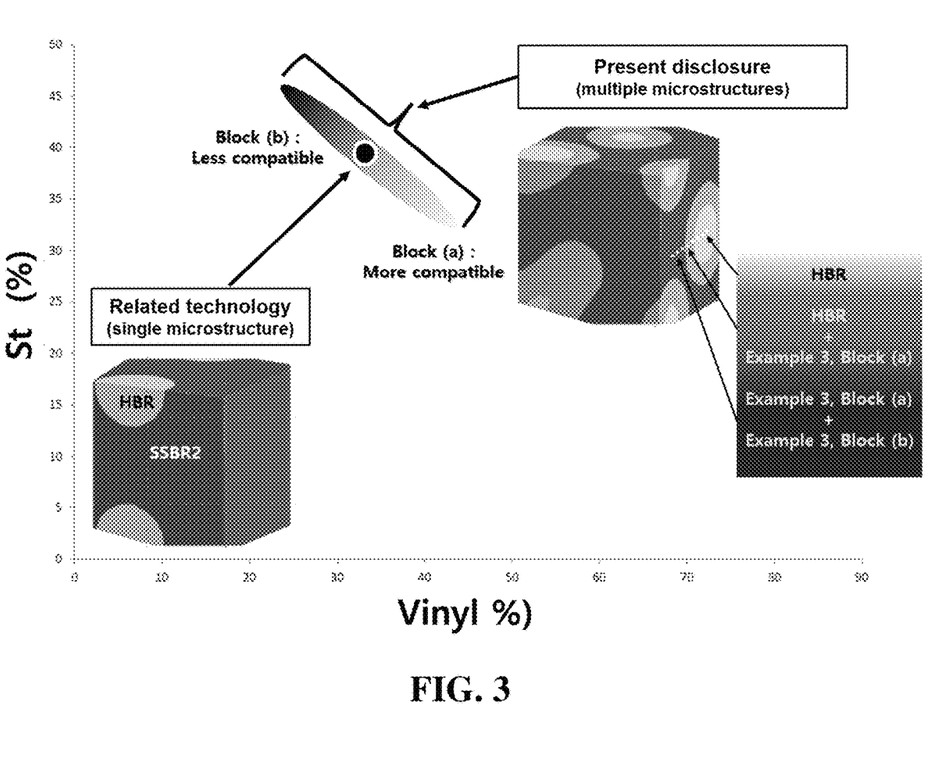
FIG. 3 schematically illustrates compatibility with butadiene rubber dependent upon the microstructure of the copolymer according to an embodiment of the present disclosure.

The microstructure distribution in specimens (A) and (B) is shown in FIG. 3.

TABLE 9

| Classification | SSBR 2 | Preparation Example 3 |
|---|---|---|
| Total styrene content in copolymer (%) | 38 | 40 |
| Total vinyl content in copolymer (%) | 33 | 33 |
| Block (a) styrene content (%) | — | 39 |
| Block (a) vinyl content (%) | — | 35 |
| Block (b) styrene content (%) | — | 44 |
| Block (b) vinyl content (%) | — | 25 |

(Blocks (a) and (b) are the same as the first and second blocks, respectively.)

Referring FIG. 3, in the case of the copolymer prepared according to an embodiment of the present disclosure, block (a) having a low styrene content is distributed near the HBR, and block (b) having a high styrene content is distributed far from the HBR. Thus, the block (a) having a relatively high vinyl content may have relatively high compatibility with butadiene rubber, thereby improving compatibility of the entire copolymer with HBR. Moreover, the block (b) having a high styrene content may have relatively low compatibility with butadiene rubber, thereby improving incompatibility of the entire copolymer with HBR. This Janus characteristic such as both high and low compatibility with HBR may be help to increase handling and wet-grip properties, respectively. On the other hand, SSBR 2 has a low vinyl ratio in the entire copolymer, and thus has poor compatibility with HBR.

Comparative Examples 5 to 6 and Example 5

Figure 4:
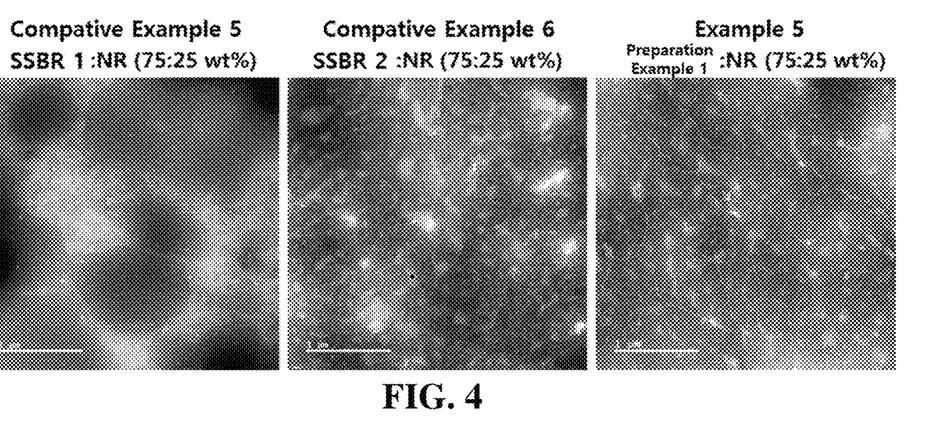
FIG. 4 shows a TEM image of a rubber specimen prepared according to an embodiment of the present disclosure and rubber specimens of Comparative Examples.

Rubber specimens were manufactured under conditions summarized in Table 10 below in the same manner as in the examples 1 to 4. The rubber specimens of Comparative Examples 5 to 6 and Examples 5 were measured by transmission electron microscope (TEM) and the results are shown in FIG. 4.

TABLE 10

| Composition | Comparative Example 5 | Comparative Example 6 | Example 5 |
|---|---|---|---|
| SSBR 1 | 75 | — | — |
| SSBR 2 | — | 75 | — |
| Preparation Example 1 | — | — | 75 |
| Natural rubber (NR) | 25 | 25 | 25 |
| Stearic acid | 2 | 2 | 2 |
| Zinc oxide | 3 | 3 | 3 |
| Silica | 80 | 80 | 80 |
| Oil | 10 | 10 | 10 |
| Si-69 | 6.4 | 6.4 | 6.4 |
| CZ | 1 | 1 | 1 |
| DPG | 1.5 | 1.5 | 1.5 |
| Sulfur | 1.5 | 1.5 | 1.5 |

(units: parts by weight)

Referring to FIG. 4, it can be confirmed that the copolymer prepared according to an embodiment of the present disclosure in Example 5 has excellent compatibility with the natural rubber (NR), thus uniformly dispersed with the NR.

On the other hand, Comparative Examples 5 and 6 prepared by combining the conventional high styrene SSBR and natural rubber can be confirmed that the agglomeration occurred due to poor compatibility with each other.

As apparent from the above description, the present disclosure provides a copolymer having excellent compatibility with a conjugated diene-based polymer while having a high aromatic vinyl-based monomer content.

Another aspect of the present disclosure provides a rubber composition suitable for production of a high-performance tire, and a method of preparing the rubber composition.

It should be understood that the effects of the present disclosure are not limited to the effects described above, but include all effects that can be deduced from the detailed description of the present disclosure or the constitution of the disclosure described in the claims.

The aforementioned description of the present disclosure is provided by way of example and those skilled in the art will understand that the present disclosure can be easily changed or modified into other specified forms without change or modification of the technical spirit or essential characteristics of the present disclosure. Therefore, it should be understood that the aforementioned examples are only provided by way of example and not provided to limit the present disclosure. For example, each of constituents described as a single form may be separately implemented and, similarly, constituents described as being separated may be implemented in a combined form.

It should be understood that the scope of the present disclosure is defined by the following claims and the disclosure is to cover all modifications, equivalents, and alternatives falling within the spirit and scope of the disclosure as defined by the claims.

What is claimed is:

1. A copolymer, comprising:
a first part comprising an aromatic vinyl-based monomer and a conjugated diene-based monomer; and
a second part comprising an aromatic vinyl-based monomer and a conjugated diene-based monomer,
wherein the content of the aromatic vinyl-based monomer is 38 to 42% by weight based on a total weight of the copolymer, and
the copolymer satisfies Equation 1 below:

$$V_1 > V_2 \qquad \text{<Equation 1>}$$

wherein $V_1$ is a vinyl content in the first part, and $V_2$ is a vinyl content in the second part;
wherein $V_1$ is 35 to 38% by weight, and $V_2$ is 19 to 28% by weight;
wherein a total vinyl content in the copolymer is 26 to 33% by weight, and
wherein the copolymer has a molecular weight distribution of 1.0 to 1.2.

2. The copolymer according to claim 1, wherein a content of the aromatic vinyl-based monomer of the first part is 15 to 45% by weight, and
a content of the aromatic vinyl-based monomer of the second part is 35 to 65% by weight.

3. The copolymer according to claim 1, wherein a weight ratio of the first part to the second part is 1:0.5 to 1.5.

4. The copolymer according to claim 1, wherein the copolymer has a weight average molecular weight of 100,000 to 250,000.

5. The copolymer according to claim 1, wherein a content of an aromatic vinyl-based block in the copolymer is 1% by weight or less.

6. The copolymer according to claim 1, wherein at least a portion of the copolymer is modified with one selected from the group consisting of piperidine, 1-[(4-ethylphenyl)methyl]-pyrrolidine, 1-(4-vinylbenzyl)pyrrolidine, N1-(3-(dimethylamino)propyl)-N3,N3-dimethyl-N1-(4-vinylbenzyl)propane-1,3-diamine, N1-(3-(dimethylamino)propyl)-N3,N3-dimethyl-N1-(4-vinylphenethyl)propane1,3-diamine, N1-(2-(dimethylamino)ethyl)-N2,N2-dimethyl-N1-(4-vinylbenzyl)ethane-1,2-diamine; N1-(3-(diethylamino)propyl)-N3,N3-diethyl-N1-(4-vinylbenzyl)propane-1,3-diamine, triethoxysilylpropyldiethylamine, 3-glycidoxypropyldimethyldimethoxysilane, dimethyldichlorosilane, trimethylchlorosilane, methyldichlorosilane, methyltrichlorosilane, phenyltrichlorosilane, vinyltrichlorosilane, and a combination of two or more thereof.

7. A rubber composition, comprising:
the copolymer according to claim 1; and
a conjugated diene-based polymer.

8. The rubber composition according to claim 7, wherein the polymer is high-cis-1,4-polybutadiene or natural rubber.

9. The rubber composition according to claim 7, wherein a weight ratio of the copolymer to the polymer is 1 to 5:1.

\* \* \* \* \*